(12) United States Patent
Van Hoyweghen, III et al.

(10) Patent No.: US 7,295,086 B2
(45) Date of Patent: Nov. 13, 2007

(54) DIELECTRIC COMPONENT ARRAY WITH FAILSAFE LINK

(75) Inventors: Joseph V. Van Hoyweghen, III, Waterford, PA (US); Edward G. Sveda, Jr., North East, PA (US); Jeffrey D. Chereson, Erie, PA (US)

(73) Assignee: Spectrum Control Inc., Fairview, PA (US)

(*) Notice: Subject to any disclaimer, the term of this patent is extended or adjusted under 35 U.S.C. 154(b) by 0 days.

(21) Appl. No.: 11/079,310

(22) Filed: Mar. 11, 2005

(65) Prior Publication Data

US 2005/0195048 A1 Sep. 8, 2005

Related U.S. Application Data

(63) Continuation-in-part of application No. 10/692,123, filed on Oct. 23, 2003, now abandoned.

(60) Provisional application No. 60/554,491, filed on Mar. 19, 2004, provisional application No. 60/420,530, filed on Oct. 23, 2002.

(51) Int. Cl.
*H03H 7/00* (2006.01)
*H01G 2/16* (2006.01)
*H01G 4/35* (2006.01)

(52) U.S. Cl. .................. 333/181; 333/182; 361/275.4; 361/302

(58) Field of Classification Search ........ 333/181–183; 361/306.2, 328, 329, 275.4, 272, 302; 439/620.26, 439/620.06–620.09
See application file for complete search history.

(56) References Cited

U.S. PATENT DOCUMENTS

| | | | |
|---|---|---|---|
| 3,597,711 A | 8/1971 | Buckley | |
| 3,617,830 A | 11/1971 | Perna, Jr. | |
| 4,148,003 A * | 4/1979 | Colburn et al. | 333/181 |
| 4,193,106 A * | 3/1980 | Coleman | 361/275.4 |
| 4,686,496 A | 8/1987 | Syrett et al. | |
| 4,820,202 A | 4/1989 | Edwards et al. | |
| 4,907,131 A * | 3/1990 | Neal | 361/534 |
| 4,950,185 A | 8/1990 | Boutros | |
| 5,112,253 A | 5/1992 | Swift | |
| 5,152,699 A | 10/1992 | Pfeifer | |
| 5,153,540 A | 10/1992 | Gliha, Jr. | |
| 5,246,389 A | 9/1993 | Briones | |
| 5,287,076 A | 2/1994 | Johnescu et al. | |
| 5,344,342 A | 9/1994 | Briones | |
| 5,406,444 A | 4/1995 | Selfried et al. | |
| 5,498,180 A | 3/1996 | Krantz et al. | |
| 5,499,935 A | 3/1996 | Powell | |
| 5,531,003 A | 7/1996 | Seifried et al. | |
| 5,580,279 A | 12/1996 | Belopolsky et al. | |
| 5,599,208 A | 2/1997 | Ward | |
| 5,603,640 A | 2/1997 | Mouissie | |
| 5,624,277 A | 4/1997 | Ward | |
| 5,626,494 A | 5/1997 | Belopolsky et al. | |
| 5,639,264 A | 6/1997 | Belopolsky et al. | |

(Continued)

*Primary Examiner*—Seungsook Ham
(74) *Attorney, Agent, or Firm*—Hodgson Russ LLP

(57) ABSTRACT

The invention includes an electromagnetic filter for a feedthrough conductor, and a method of making such a filter. At least two dielectric components are supported from a first side of a substrate, such as a housing or a printed circuit board. At least one of the dielectric components is associated with a failsafe link.

13 Claims, 9 Drawing Sheets

HATCHED AREAS INDICATE CONDUCTIVE AREAS

U.S. PATENT DOCUMENTS

| | | |
|---|---|---|
| 5,650,759 A | 7/1997 | Hittman et al. |
| 5,661,628 A * | 8/1997 | Yamagami ............... 361/275.4 |
| 5,769,667 A | 6/1998 | Belopolsky |
| 5,797,765 A | 8/1998 | Barnett et al. |
| 5,803,769 A | 9/1998 | Belopolsky |
| 5,823,827 A | 10/1998 | Belopolsky |
| 5,830,016 A | 11/1998 | Chuang |
| 5,861,809 A * | 1/1999 | Eckstein et al. ......... 340/572.3 |
| 5,959,829 A | 9/1999 | Stevenson et al. |
| 6,120,326 A | 9/2000 | Brooks |
| 6,396,678 B1 | 5/2002 | Meppelink et al. |
| 6,456,554 B1 * | 9/2002 | Gelsomini ................ 365/226 |

* cited by examiner

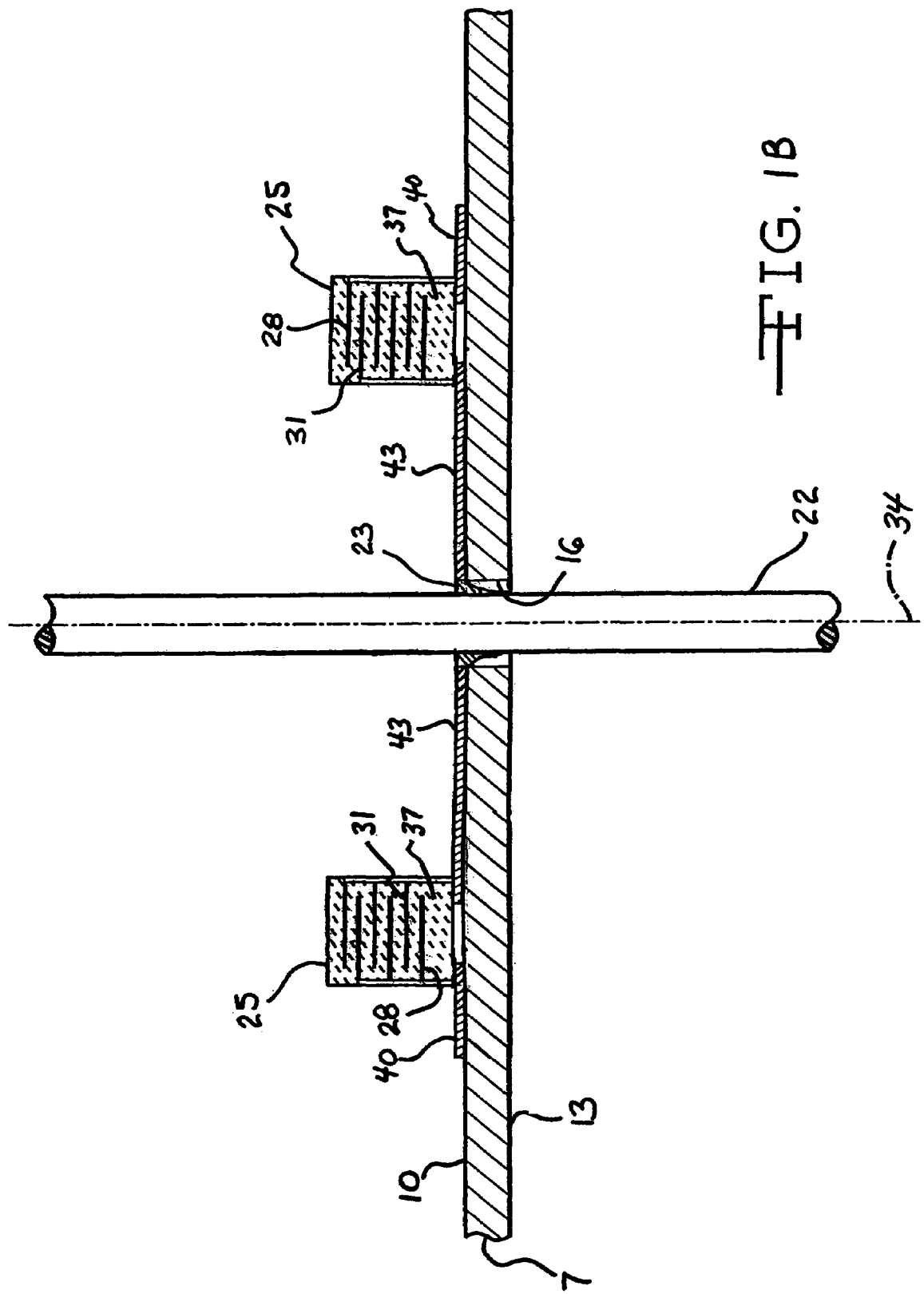

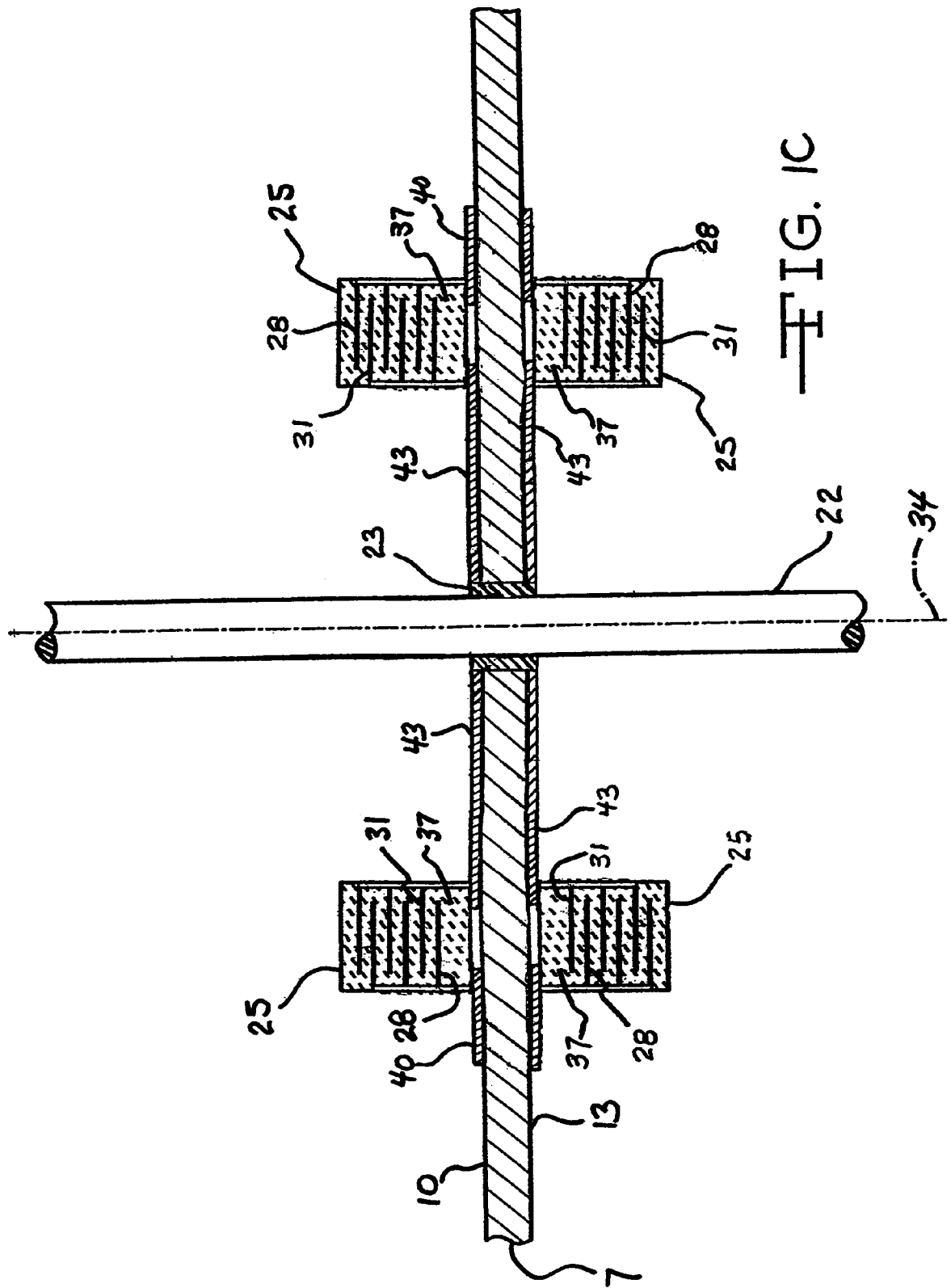
FIG. IC

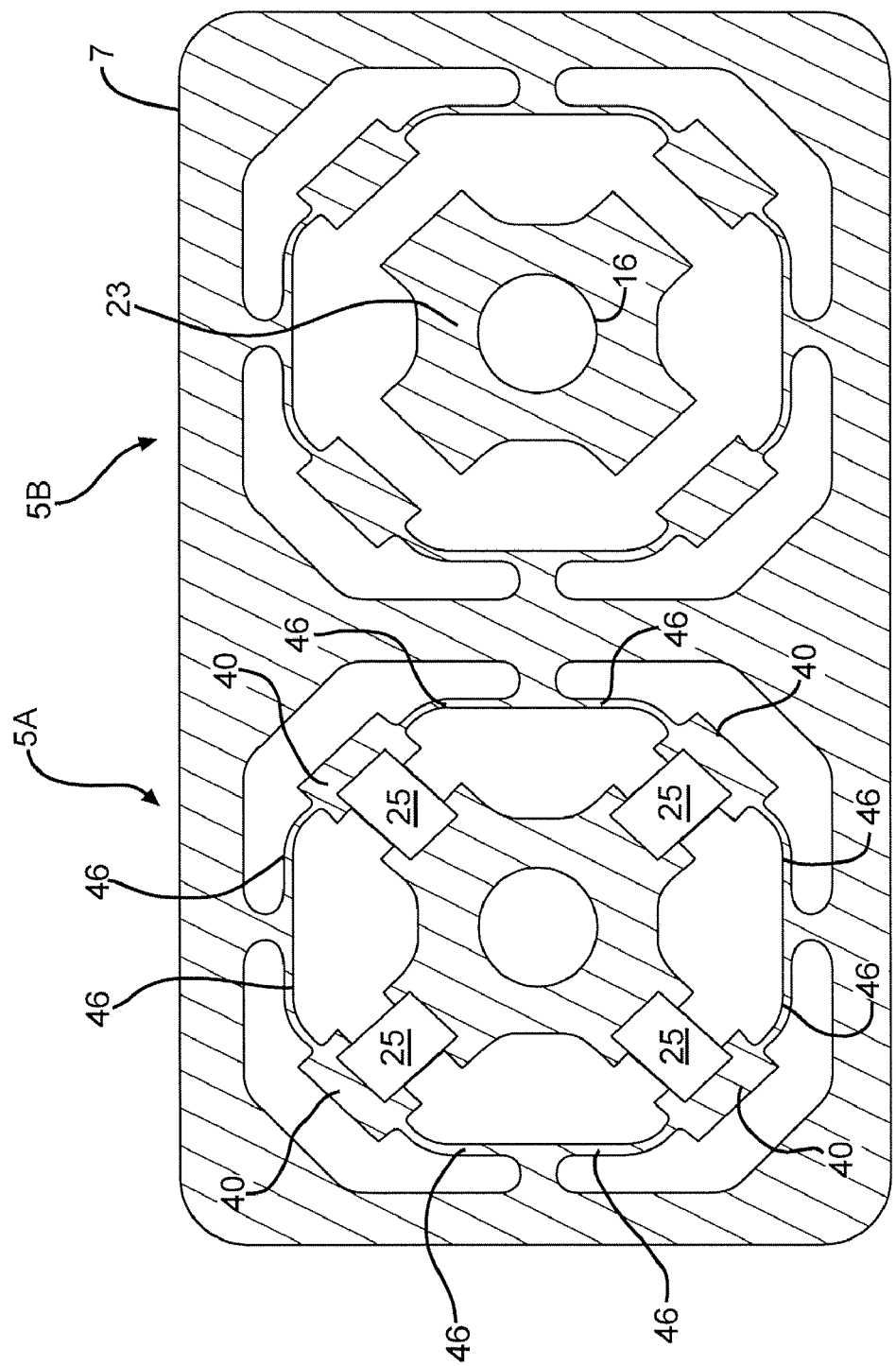

DIELECTRIC COMPONENT ARRAY WITH FAILSAFE LINK

CROSS-REFERENCE TO RELATED APPLICATIONS

This application claims the benefit of priority to U.S. provisional patent application Ser. No. 60/554,491, filed on Mar. 19, 2004, now abandoned. Further, this application is a continuation-in-part of U.S. patent application Ser. No. 10/692,123, filed Oct. 23, 2003, now abandoned. U.S. patent application Ser. No. 10/692,123 claims priority to 60/420,530, which was filed on Oct. 23, 2002.

FIELD OF THE INVENTION

The present invention relates to electromagnetic filters and methods of providing electromagnetic filters.

BACKGROUND OF THE INVENTION

In the prior art, it is known to use a discoidal capacitor circumferentially surrounding a feedthrough conductor. Such arrangements have cylindrical inner and outer electrode portions. The outer electrode portion is electrically connected to a ground plate, and an electrical connection is made between the inner electrode and the feedthrough conductor. As a result of using a discoidal capacitor, such arrangements are expensive and design changes are not easily accommodated.

Furthermore, many types of capacitors fail when a short develops in the capacitor. When a discoidal capacitor surrounds a feedthrough conductor and the capacitor shorts, the filtering previously provided by the capacitor is often lost or significantly degraded. Furthermore, a short in the discoidal capacitor may result in an increase in the electric current being provided to the capacitor. The increased current will often result in an increase in temperature, which may result in a fire or damage to surrounding components.

SUMMARY OF THE INVENTION

The invention includes an electromagnetic filter for a feedthrough conductor. In one embodiment of the invention, at least two dielectric components are supported from a first side of a substrate. For example, the dielectric components may be capacitors. The first side may be substantially planar. The substrate may have a second side and a feedthrough surface. The feedthrough surface may define an orifice extending from the first side to the second side. A feedthrough conductor may extend through the orifice. A failsafe device may be electrically connected between the feedthrough conductor and a first lead of at least one of the dielectric components. Alternatively, or in addition, a failsafe device may be electrically connected between a second lead of the dielectric component and a circuit to which the capacitor is electrically linked. The failsafe device may be a fusible link or a dielectric link.

The invention also includes a method of providing an electromagnetic filter. In a method according to the invention, a substrate is provided. The substrate may have a substantially planar first side, a second side and a feedthrough surface. The feedthrough surface may define an orifice extending from the first side to the second side. A feedthrough conductor may be provided so that the feedthrough conductor extends through the orifice. A first dielectric component may be supported from the first side and proximate to the feedthrough conductor. A second dielectric component may be supported from the first side and proximate to the feedthrough conductor. A failsafe device may be provided for one or more of the dielectric components. Such a failsafe device may be provided (a) electrically between the feedthrough conductor and a first lead of the dielectric component, and/or (b) electrically between a second lead of the dielectric component and a circuit, such as a noise handling circuit, to which the capacitor is electrically linked.

BRIEF DESCRIPTION OF THE DRAWINGS

For a fuller understanding of the nature and objects of the invention, reference should be made to the following detailed description taken in conjunction with the accompanying drawings, in which:

FIG. 1B is a cross-sectional view of the device depicted in FIG. 1A taken along the line 1B-1B.

FIG. 1C is a variation of the device depicted in FIG. 1A and FIG. 1B;

FIG. 2 is a plan view schematic of a device according to the invention;

DETAILED DESCRIPTION OF THE INVENTION

Figure 1A:
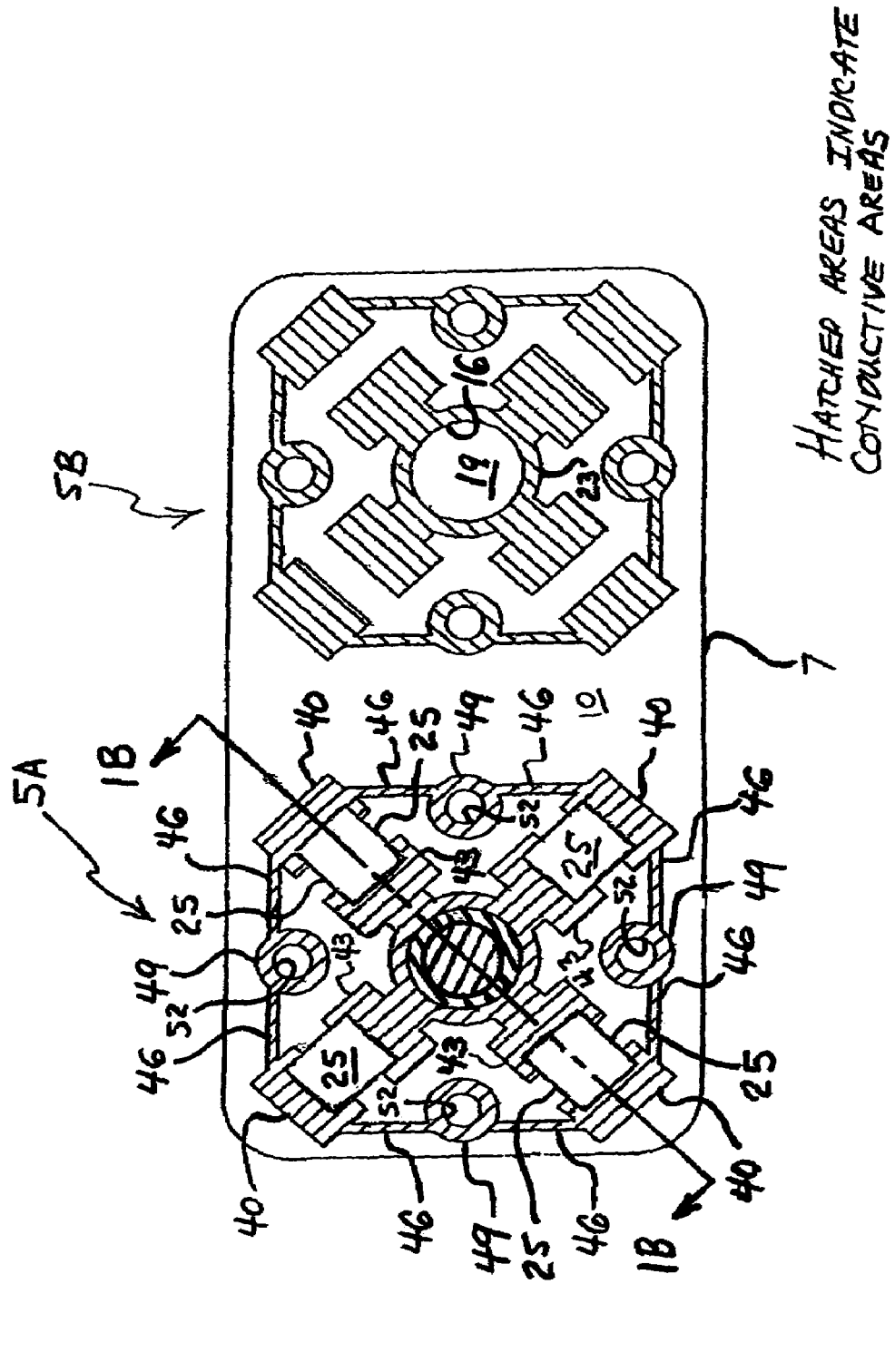
FIG. 1A is a plan view schematic of a device according to the invention.

An embodiment of the invention may be made in the form of an electromagnetic filter. FIGS. 1A and 1B depict such a filter. In order to better illustrate how the invention might be embodied, it should be noted that the left-side and right-side positions 5A, 5B are identical, except that the left-side position 5A includes capacitors and a feedthrough conductor. Feature numbers for the right-side position 5B have been limited for clarity.

The filter may include a substrate 7 having a substantially planar first side 10. The substrate 7 may be a protective housing or a printed circuit board. The substrate 7 may have a second side 13 and a feedthrough surface 16. The feedthrough surface 16 may define an orifice 19 extending from the first side 10 to the second side 13. A feedthrough conductor 22 may extend through the orifice 19.

FIGS. 1A and 1B show dielectric components 25 being supported from the first side 10 of the substrate 7. Each dielectric component 25 may partially surround the conductor 22. Each of the dielectric components 25 may be a capacitor positioned to filter a signal carried by the feedthrough conductor 22. The conductor 22 may be positioned to extend through the substrate 7 so that a high potential terminal 23 surrounds the conductor 22. In such an arrangement, the capacitors 25 may be positioned around the conductor 22, and may be electrically connected so as to filter a signal traveling through the conductor 22. To provide clarity, no capacitor 25 or conductor 22 is shown on the right-side position 5B, but it should be understood that capacitors 25 may be associated with either positions 5A, 5B, or both.

FIG. 1B shows a device according to the invention, which has been partially cross-sectioned to show certain features. For example, the capacitors 25 may have plates 28, 31 oriented in a plane that is substantially perpendicular to an axis 34 of the feedthrough conductor 22 and separated by a dielectric material 37. The dielectric material 37 may be barium-titanate, magnesium titanate, alumina, polyester, polyamide or a metal-oxide. As more discrete dielectric components 25 are added around a conductor 22, the electromagnetic characteristics approach that of a discoidal capacitor. If the discrete dielectric components are chip capacitors supported from the same surface of the substrate 7, a reduction in cost may be realized since chip capacitors tend to be much less expensive than discoidal capacitors. Further, since chip capacitors may have the same or similar exterior dimensions but different electromagnetic characteristics, changes in the electromagnetic characteristics of a filter made according to the invention may be more easily accommodated. FIG. 1C is a device according to the invention in which the arrangement shown in FIG. 1B is made on both sides 10, 13 of the substrate 7.

One or more of the dielectric components 25 may be electrically connected to a first conductive contact 40, which may be associated with circuitry on the first side 10. The first conductive contact 40 may be a trace on the substrate 7. The first conductive contact 40 may be electrically connected to one of the plates 28. Although the first conductive contact 40 may be used to fix the dielectric component 25 relative to the substrate 7, the first conductive contact 40 need not be used for that purpose. Each dielectric component 25 may be packaged in such a way that the dielectric component 25 has a side joined to the substrate 7 by a conductive or non-conductive material. For example, an adhesive may be used to mechanically join the dielectric component 25 to the first side 10 so as to fix the dielectric component 25 to the substrate 7.

Further, one or more of the dielectric components 25 may be electrically connected via a second conductive contact 43 to the feedthrough conductor 22. The second conductive contact 43 may be electrically connected to the other of the plates 31 and to the feedthrough conductor 22. The second conductive contact 43 may be connected to the feedthrough conductor 22 at a location that is not within the orifice 19. With such an arrangement, the first conductive contact 40 may be at a first electric potential and the conductor 22 may be at a second electric potential.

A failsafe link 46 may be positioned electrically between the capacitor 25 and a low potential terminal 49. For example, the failsafe link 46 may electrically join the low potential terminal 49 to the first conductive contact 40. In that arrangement, the failsafe link 46, the low potential terminal 49 and the first conductive contact 40 may be at substantially the same electric potential. The failsafe link 46 may be positioned so that electric current traveling between the first conductive contact 40 and the low potential terminal 49 also passes through the failsafe link 46. The low potential terminal 49 may be part of, or electrically connected to, a noise handling circuit. The noise handling circuit may be on the substrate 7.

The low potential terminal 49 may be electrically associated with a via 52 that extends through the substrate 7. The via 52 may be an electrically conductive pathway that extends from one side of the substrate 7 to the other side of the substrate 7. In this fashion, the low potential terminal 49 may be located on one side of the substrate 7 (for example, the first side 10), while the noise handling circuit may be located on another side of the substrate 7 (for example, the second side 13).

Figure 1D:
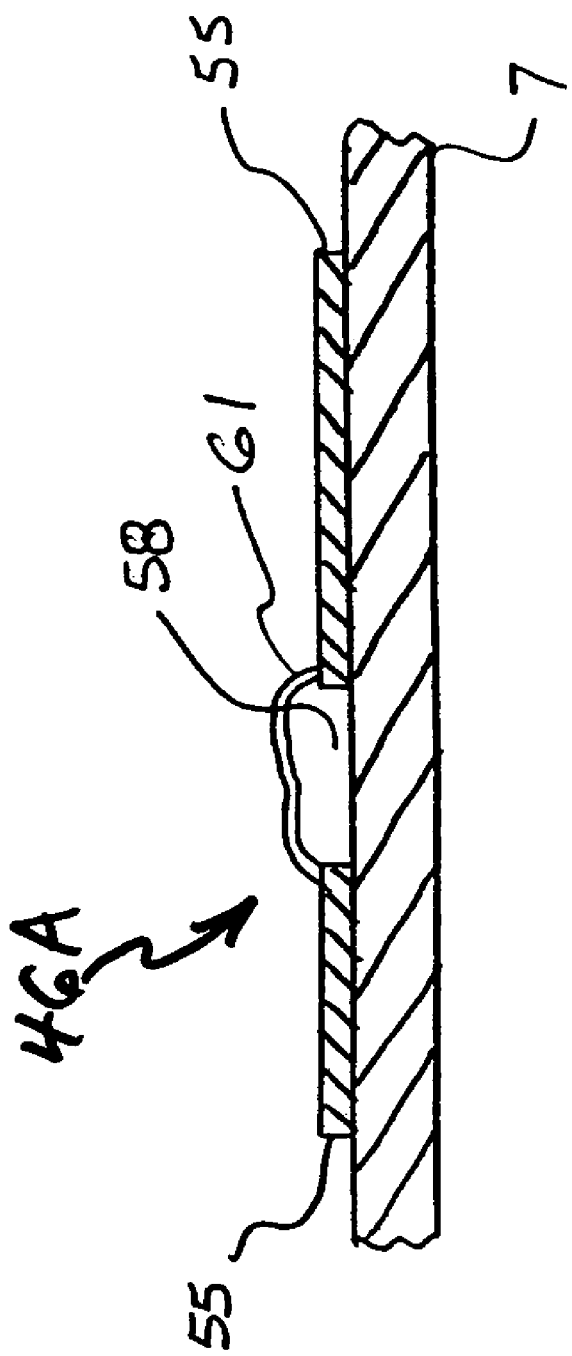
FIG. 1D is a partially cross-sectioned side view of a fusible link according to the invention.

FIG. 1D depicts an example of a failsafe link 46 in the form of a fusible link 46A. The fusible link 46A may be formed on the substrate 7 by fixing a conductive precursor 55, such as a copper trace to the substrate 7. A portion of the conductive precursor 55 may then be removed, for example by milling or die cutting, in order form a gap 58 and therefore provide the conductive precursor 55 in two distinct parts with no conductive path between them. Alternatively, the precursor 55 may be formed on the substrate 7 as two distinct parts having the gap 58 between the parts. At this stage of forming the fusible link 46A, electric current will not flow from the first conductive contact 40 to the low potential terminal 49 due to the gap 58. Next, a fusible bridge 61 may be placed so as to electrically connect the two parts of the precursor 55. The fusible bridge 61 may be a material that is known to fuse open at a desired current more readily than the precursor 55. For example, (a) the fusible bridge 61 may be made from a material having characteristics that cause the bridge 61 to fuse open quicker, or with greater certainty, or both, or (b) the dimensions of the fusible bridge 61 may more tightly controlled than those of the precursor 55, or both (a) and (b). The fusible bridge 61 may be made from a solder, an ultra fine wire, or other resistive material.

Figure 1E:
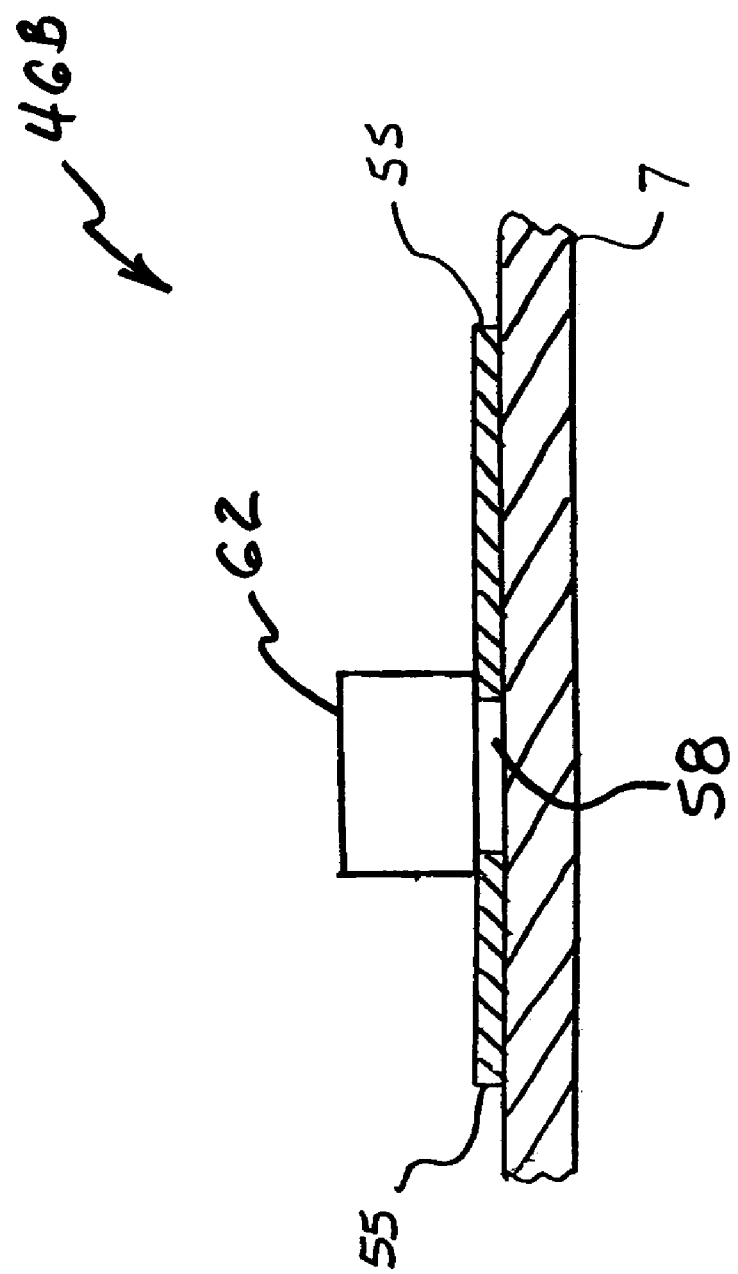
FIG. 1E is a partially cross-sectioned side view of a dielectric link according to the invention.

FIG. 1E depicts an example of a failsafe link 46 in the form of a dielectric link 46B. The dielectric link 46B may be formed on the substrate 7 by fixing a conductive precursor 55, such as a copper trace to the substrate 7. A portion of the conductive precursor 55 may then be removed, for example by milling or die cutting, in order form a gap 58 and therefore provide the conductive precursor 55 in two distinct parts with no conductive path between them. Alternatively, the precursor 55 may be formed on the substrate 7 as two distinct parts having the gap 58 between the parts. At this stage of forming the dielectric link 46B, electric current will not flow from the first conductive contact 40 to the low potential terminal 49 due to the gap 58. Next, a dielectric bridge 62 may be placed so as to electrically connect the two parts of the precursor 55. The dielectric bridge 62 may be a dielectric component, such as a chip capacitor, which may include a dielectric material 37 similar to that used in the dielectric component 25. Further, the dielectric bridge 62 may be a dielectric paste.

FIG. 2 depicts an embodiment of the invention in which the substrate 7 is made from a conductive material. The left-side and right-side positions 5A, 5B are identical in order to better illustrate how the invention might be embodied. To illustrate where the capacitors 25 might be placed, the left-side position 5A has capacitors 25. A conductor (not shown) may be positioned to extend through the conductive substrate 7 so that the high potential terminal 23 surrounds the conductor. In such an arrangement, the capacitors 25 may be positioned around the conductor, and may be electrically connected so as to conduct a noise current traveling through the conductor to ground. For purposes of clarity, no capacitor 25 is shown on the right-side position 5B, but it should be understood that capacitors 25 may be associated with either positions 5A, 5B, or both. Features similar to those depicted in prior figures have the same feature number in FIG. 2.

Figure 3:
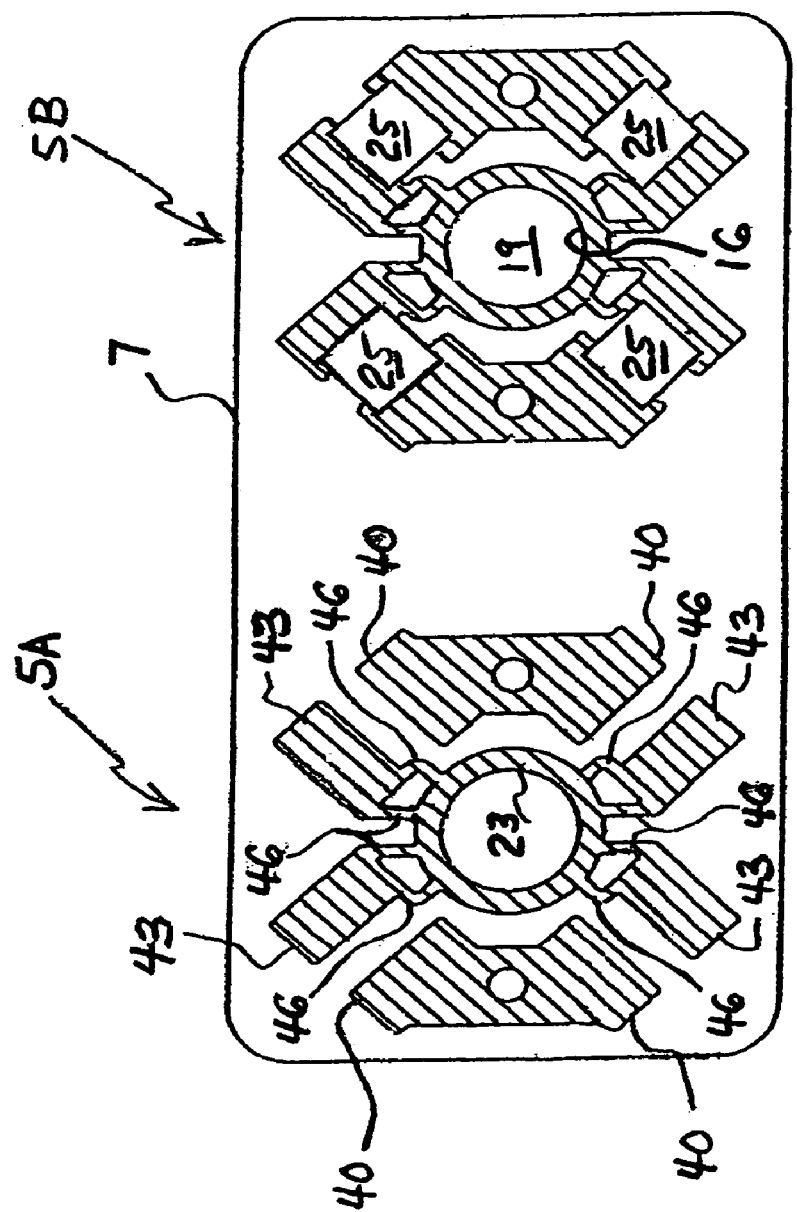
FIG. 3 is a plan view schematic of a device according to the invention.

FIG. 3 depicts an embodiment of the invention in which the left-side and right-side positions 5A, 5B are identical in order to better illustrate how the invention might be embodied. In FIG. 3, the failsafe links 46 are positioned between the second conductive contact 43 and the high potential terminal 23. To illustrate where the capacitors 25 might be placed, the right-side position 5B has capacitors 25. A feedthrough conductor (not shown) may be positioned to extend through the substrate 7 so that the high potential terminal 23 surrounds the conductor. In such an arrangement, the capacitors 25 would be positioned around the conductor, and may be electrically connected so as to filter a signal traveling through the conductor. For purposes of clarity, no capacitor 25 is shown on the left-side position 5A, but it should be understood that capacitors 25 may be associated with either positions 5A, 5B, or both. Features similar to those depicted in prior figures have the same feature number in FIG. 3.

Figure 4:
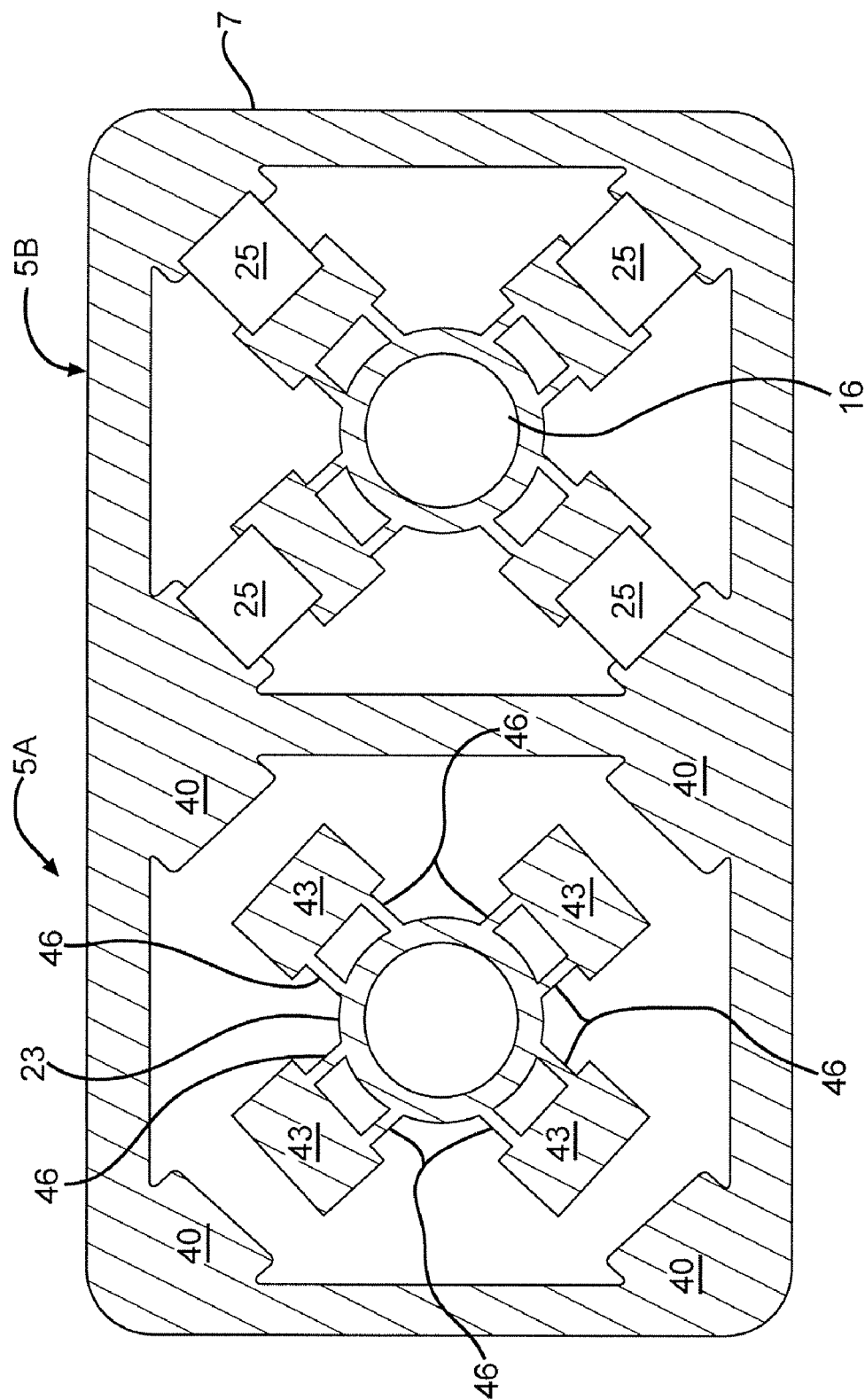
FIG. 4 is a plan view schematic of a device according to the invention.

In FIG. 4, the left-side and right-side positions 5A, 5B are identical in order to better illustrate how the invention might be embodied. In FIG. 4, the failsafe links 46 are positioned between the second conductive contact 43 and the high potential terminal 23. To illustrate where the capacitors 25 might be placed, the right-side position 5B has capacitors 25. A conductor (not shown) may be positioned to extend through the substrate so that the high potential terminal 23 surrounds the conductor. In such an arrangement, the capacitors 25 would be positioned around the conductor, and may be electrically connected so as to filter a signal traveling through the conductor. For clarity, no capacitor 25 is shown on the left-side position 5A, but it should be understood that capacitors 25 may be associated with position 5A, position 5B, or both.

Figure 5:
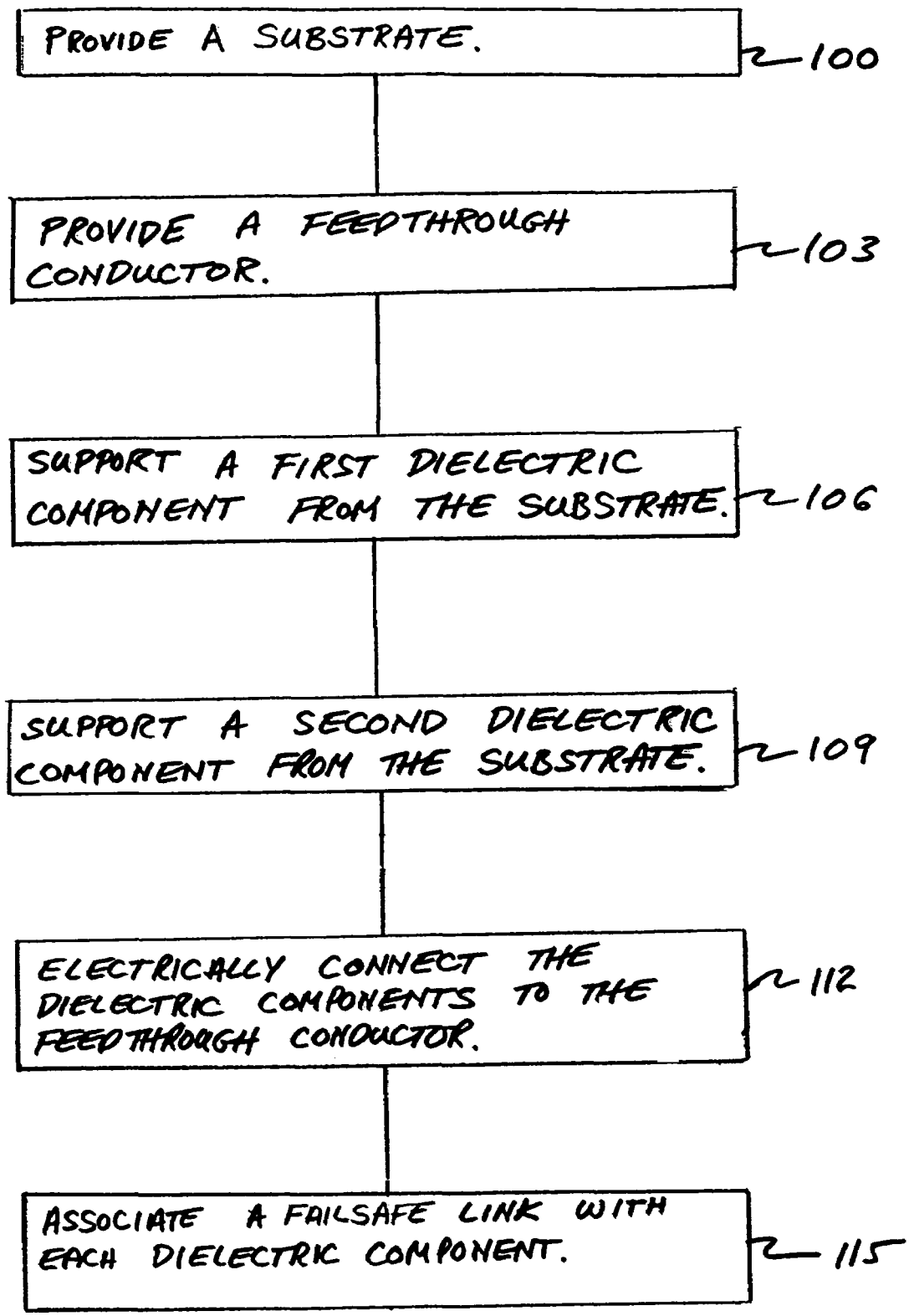
FIG. 5 depicts a method according to the invention.

FIG. 5 is a flow chart of a method according to the invention. In an embodiment of the invention, a substrate is provided 100. The substrate may have a substantially planar first side, a second side and a feedthrough surface. The feedthrough surface may define an orifice extending from the first side to the second side, and a feedthrough conductor may be provided 103 to extend through the orifice. A first dielectric component may be supported 106 from the first side and proximate to the feedthrough conductor, and the first dielectric component may be joined to the substrate, for example by soldering at least a portion of the first side to a conductive contact of the dielectric component. A second dielectric component may be supported 109 from the first side and joined to the substrate in a fashion similar to that used for the first dielectric component. Each of the dielectric components may be electrically connected 112 to the feedthrough conductor, for example by soldering a conductive contact of each dielectric component to the feedthrough conductor. Each of the dielectric components may be associated 15 with a respective failsafe link. The failsafe link may be electrically positioned between the feed through conductor and the dielectric component, or electrically between the dielectric component and a circuit, or both. The failsafe link may be a fusible link or a dielectric link.

Provisional patent application No. 60/554,491 provides information related to the invention and describes embodiments of the invention. That provisional patent application is incorporated herein by reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An electromagnetic filter comprising:
a substrate having a substantially planar first side, a second side and a feedthrough surface, the feedthrough surface defining an orifice extending from the first side to the second side;
a feedthrough conductor extending through the orifice;
a first dielectric component supported from the first side and partially surrounding the conductor;
a second dielectric component supported from the first side and partially surrounding the conductor;
a noise handling circuit terminal on the substrate; and
a failsafe link electrically connecting at least one of the dielectric components to the noise handling circuit terminal.

2. The filter of claim 1, wherein the first dielectric component is a capacitor.

3. The filter of claim 1, wherein the failsafe link includes a trace fixed to the first side of the substrate.

4. The filter of claim 1, wherein the first dielectric component has a first conductive plate electrically connected to and at the same electric potential as the failsafe link, and a second conductive plate separated from the first conductive plate by a dielectric material.

5. The filter of claim 1, wherein the failsafe link is at a first electric potential and the conductor is at a second electric potential.

6. The filter of claim 1, wherein the first dielectric component is joined to the substrate by a conductive material.

7. The filter of claim 1, further comprising a via electrically connecting the noise handling circuit terminal to the failsafe link.

8. The filter of claim 1, wherein the failsafe link includes a first conductive precursor and a second conductive precursor electrically joined by a fusible bridge.

9. The filter of claim 8, wherein the fusible bridge is formed from a first material and the first conductive precursor is formed from a second material.

10. The filter of claim 1, wherein the failsafe link includes a first conductive precursor and a second conductive precursor electrically joined by a dielectric bridge.

11. The filter of claim 1, wherein the failsafe link is a dielectric link or a fusible link.

12. A method of providing an electromagnetic filter, comprising:
providing a substrate having a substantially planar first side, a second side and a feedthrough surface, the feedthrough surface defining an orifice extending from the first side to the second side;
providing a feedthrough conductor extending through the orifice;
supporting a first dielectric component from the first side and proximate to the feedthrough conductor;
supporting a second dielectric component from the first side and proximate to the feedthrough conductor;
providing a noise handling circuit terminal on the substrate; and
providing a failsafe link electrically connecting at least one of the dielectric components to the noise handling circuit terminal.

13. The method of claim 12, wherein the failsafe link is provided by:
providing a first conductive precursor and a second conductive precursor having a gap between the precursors;
providing a fusible bridge between the precursors.

* * * * *